Jan. 23, 1968 PER-ÅKE BYLUND ET AL 3,364,987

RECTIFIER ASSEMBLY COMPRISING SEMI-CONDUCTOR RECTIFIERS WITH TWO SEPARATE HEAT SINKS

Filed Sept. 23, 1965

INVENTORS
PER-ÅKE BYLUND
GUNNAR MELLGREN
BY
Bailey, Stephens & Huettig
ATTORNEYS 3,364,987

RECTIFIER ASSEMBLY COMPRISING SEMI-CONDUCTOR RECTIFIERS WITH TWO SEPARATE HEAT SINKS

Per-Åke Bylund and Gunnar Mellgren, Vasteras, Sweden, assignors to Allmänna Svenska Elektriska Aktiebolaget, Vasteras, Sweden, a corporation of Sweden Filed Sept. 23, 1965, Ser. No. 489,570
Claims priority, application Sweden, Oct. 17, 1964, 12,537/64
7 Claims. (Cl. 165—80)

The present invention relates to a rectifier assembly comprising semi-conductor rectifiers with two separate heat sinks.

In order to increase the maximum load of semi-conductor rectifiers, rectifiers have been produced in which each of the two surfaces of the semi-conductor elements is in electrical and thermic contact with a heat sink which is suitably also provided with connections for the load current.

When such rectifiers are joined together into larger units, rectifier assemblies, certain problems occur. In order to simplify testing and serving the rectifiers should be as accessible as possible. Visual inspection of the semi-conductor capsule itself should be easy to carry out. With controlled rectifiers the ignition leads should be accessible and easy to bring out of the cooling art duct. Further, it is not desirable that the current of cooling air shall pass through the space between the heat sinks, because if it does the ignition leads situated there easily start to vibrate, whereby their easily damaged soldered connections to the semi-conductor element can be damaged. Opposed to these requirements is the requirement that the rectifier assembly shall form an airtight duct for the cooled air.

The object of the present invention is to obtain a rectifier assembly which is simple and inexpensive and which meets all the above mentioned requirements.

A rectifier assembly according to the invention is characterised in that a cooling air duct with two walls is arranged so that the rectifiers can be inserted from one side into the drum and that the drum is provided with bars parallel to the direction of insertion of the rectifiers, which prevents the cooling air flow from penetrating into the space between the cooling bodies.

Figure 1:
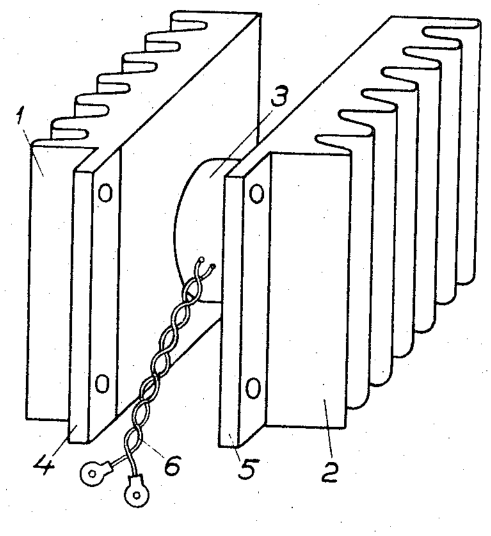
Figure 2:
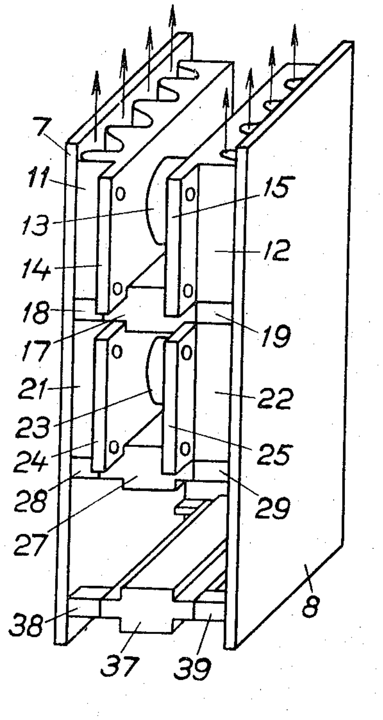
Figure 3:
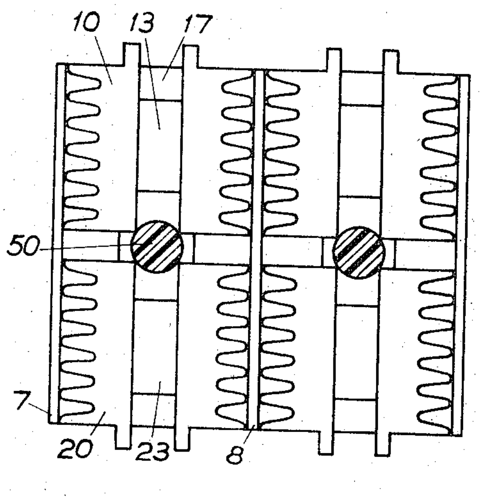

The invention will be more fully described in connection with the accompanying drawings, where FIGURE 1 shows a semi-conductor rectifier known per se with two separate heat sinks. FIGURE 2 shows the principle of a rectifier assembly according to the invention. FIGURE 3 shows two further embodiments of the invention, namely on the one hand how the cooling air duct can be made so that a cross section of it houses two rectifiers inserted from opposite sides, and on the other hand how several cooling air ducts can be placed beside each other with common partition walls.

FIGURE 1 shows schematically an example of a semi-conductor rectifier known per se with two separate heat sinks. The numerals 1 and 2 are the heat sinks which are provided with cooling fins. Between the heat sinks lies the encapsulated semi-conductor element 3. The heat sinks are held together for example by bolts, not shown here, and they are provided with flanges 4 and 5 to which the load current leads can be connected. The leads 6 for the ignition current are brought out from the semi-conductor element and lie in the space between the cooling bodies.

The rectifier assembly shown in FIGURE 2 according to the invention consists of a cooling air duct with the walls 7 and 8, which preferably are made of insulating material. Between the walls lie the rectifiers, of which two are shown. These have the heat sinks 11 and 12, and 21 and 22, the semi-conductor elements 13 and 23 and the connection flanges 14 and 15, 24 and 25. The cooling air flow marked by arrows flows in the spaces between the cooling flanges, which spaces are restricted outwards by the walls of the duct. The bars 17, 27 and 37 which in the shown embodiment also serve to support the rectifiers prevent the cooling air flow from passing through the space between the heat sinks. In order to join the bars to the walls of the duct, the bodies 18, 19, 28, 29 and 38, 39 can, for example, be used. These can suitably have the same dimension in the longitudinal direction of the duct as the distance between two subsequent rectifiers, whereby the cooling air channels become completely separated from the surrounding air. In order to obtain the necessary electrical insulation, the bars 17, 27 and 37, as well as the connecting bodes 18, 19, 28, 29 and 38, 39, should preferably be made of insulating material.

FIGURE 3 shows a cross section of a rectifier assembly according to the invention, perpendicular to the flow direction of the cooling air. In larger converters it is often desirable to join together several simple rectifier assemblies into larger units. It can then be suitable to make the cooling air duct so that the rectifiers can be inserted in pairs from opposite sides of the cooling air duct. In the FIGURES 10 and 20 are such a pair of rectifiers with semi-conductor capsules 13 and 23 respectively. The numeral 17 is the bar lying behind (under) the rectifiers, which prevents the cooling air from passing into and through the space between the heat sinks. The cylindrical body 50, which is parallel to the longitudinal axis of the duct and is preferably made of insulating material, on the one hand prevents the cooling air which also flows in the space between the rectifiers 10 and 20 from passing into and through the space between the heat sinks of the rectifiers, and on the other hand gives a suitable separation between the rectifiers 10 and 20.

As FIGURE 3 shows, several single rectifier assemblies (cooling air ducts) may be placed beside each other and the wall (8 in the figure) separating two ducts may preferably be common to those two ducts.

As is evident from the above, the device according to the invention complies with all the requirements mentioned above. The rectifiers are particularly easily accessible for assembly, servicing and exchanging. The semi-conductor capsules can be inspected without bother. The ignition leads are directly accessible for connection to the control device of the converter. Further, upon the insertion of the rectifiers and into the ducts, the cooling air ducts are automatically sealed off from the surrounding air and from the space between the heat sinks. The ignition cables are thus protected from damaging vibrations. A rectifier assembly according to the invention is also simple and thus cheap to manufacture.

The embodiments shown on the drawing are only to illustrate the principle of a rectifier assembly according to the invention and embodiments other than those shown are also feasible within the scope of the invention.

We claim:

1. In a rectifier assembly comprising semi-conductor rectifiers with two separate heat sinks, a cooling air duct having two walls laterally closing said sinks, said assembly including means permitting insertion of said rectifiers into the duct from the side of the duct, and sealing means to prevent cooling air from flowing in the space between said heat sinks, said sealing means comprising bars extending parallel to the direction of insertion into the duct of the rectifiers.

2. In a rectifier assembly as claimed in claim 1, said sealing means constituting supporting means for the rectifiers.

3. In a rectifier assembly as claimed in claim 1, supporting means for the bars, said supporting means for the bars comprising connecting bodies joining the ends of said bars to the walls of the cooling air duct, said connecting bodies having a dimension in the longitudinal direction of the duct equal to the spacing between two adjacent rectifiers, whereby the cooling air is prevented from flowing between the duct and the surrounding air in the space between two adjacent rectifiers.

4. A rectifier assembly as claimed in claim 1, each of the heat sinks of said rectifiers having at least two cooling fins, said fins being substantially parallel to the longitudinal axis of the cooling air duct, at least two of said fins reaching out to the walls of the duct, whereby a closed channel for the cooling air flow is created.

5. A rectifier assembly as claimed in claim 1, a cross-section of the cooling air duct perpendicular to the longitudinal axis of the duct housing two rectifiers, said rectifiers being insertable from opposite sides of the duct.

6. In a rectifier assembly as claimed in claim 5, a cylindrical body situated centrally in the cooling air duct and having its longitudinal axis substantially parallel to the longitudinal axis of the cooling duct.

7. In a rectifier assembly as claimed in claim 1, at least two cooling air ducts, said ducts being placed side by side and having a common intermediate wall.

References Cited

UNITED STATES PATENTS

| | | | |
|---|---|---|---|
| 2,815,472 | 12/1957 | Jackson et al. | 317—234 |
| 2,842,722 | 7/1958 | Diebold | 317—234 |
| 2,936,409 | 5/1960 | Jackson et al. | 317—234 |
| 3,005,945 | 10/1961 | Salzer | 321—11 |

FOREIGN PATENTS

| | | |
|---|---|---|
| 1,159,566 | 12/1963 | Germany. |

ROBERT A. O'LEARY, *Primary Examiner.*

A. W. DAVIS, *Assistant Examiner.*